(12) United States Patent
Radhakrishnan et al.

(10) Patent No.: US 7,409,407 B2
(45) Date of Patent: *Aug. 5, 2008

(54) MULTIMEDIA EVENT DETECTION AND SUMMARIZATION

(75) Inventors: Regunathan Radhakrishnan, Quincy, MA (US); Ajay Divakaran, Burlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 785 days.

This patent is subject to a terminal disclaimer.

(21) Appl. No.: 10/840,824

(22) Filed: May 7, 2004

(65) Prior Publication Data

US 2005/0249412 A1    Nov. 10, 2005

(51) Int. Cl.
G06F 17/30    (2006.01)
G06F 17/00    (2006.01)

(52) U.S. Cl. .................................... 707/102; 707/104.1
(58) Field of Classification Search ................ 707/104.1
See application file for complete search history.

(56) References Cited

U.S. PATENT DOCUMENTS 6,697,523 B1    2/2004    Divakaran et al. ........... 382/173

2005/0251532 A1*    11/2005    Radhakrishnan et al. . 707/104.1

OTHER PUBLICATIONS

Hsu, et al., "A statistical framework for fusing mid-level perceptual features in news story segmentation," *Proc. of ICME*, 2003.
Aner, et al., "Video summaries through mosaic-based shot and scene clustering," *Proc. European Conference on Computer Vision*, 2002.
Pan, et al., "Detection of slow-motion replay segments in sports video for highlights generation," *Proc. IEEE International Conf. on Acoustics, Speech and Signal Processing*, 2001.
Xie, et al., "Unsupervised mining of statistical temporal structures in video," *Video Mining*, Rosenfeld et al. Eds, Kluwer Academic Publishers, 2003.
Sundaram, et al., "Determining computable scenes in films and their structures using audio-visual memory models," *ACM Multimedia*, 2000.
Wu, et al., "Multi-camera spatio-temporal fusion and biased sequence data learning for security surveillance," *ACM Multimedia*, 2003.
Shi, et al., "Normalized cuts and image segmentation," *Proc. of IEEE Conference on Computer Vision and Pattern Recognition*, 1997.

* cited by examiner

*Primary Examiner*—Tony Mahmoudi
(74) *Attorney, Agent, or Firm*—Dirk Brinkman; Clifton D. Muell; Gene V. Vinokur

(57) ABSTRACT

A method detects events in multimedia. Features are extracted from the multimedia. The features are sampled using a sliding window to obtain samples. A context model is constructed for each sample. An affinity matrix is determined from the models and a commutative distance metric between each pair of context models. A second generation eigenvector is determined for the affinity matrix, and the samples are then clustered into events according to the second generation eigenvector.

11 Claims, 2 Drawing Sheets

MULTIMEDIA EVENT DETECTION AND SUMMARIZATION

FIELD OF THE INVENTION

This invention relates generally to analyzing multimedia, and more particularly to summarizing the multimedia according to patterns of events in the content.

BACKGROUND OF THE INVENTION

Most prior art methods for summarizing multimedia content have focused on detecting known patterns of events in the content to provide a summary of the content. As a result, the patterns of events that are useful for summarizing are limited to particular known genres of multimedia. It is also well known how to extract the patterns using supervised statistical learning tools.

For news video, detection of 'story' boundaries, by closed caption text, speech transcript analysis, and speaker-based segmentation have been shown to be useful, Rainer, "Automatic text recognition for video indexing," *Proc. ACM Multimedia*, 1996, and Hsu et al., "A statistical framework for fusing mid-level perceptual features in news story segmentation," *Proc. of ICME*, 2003.

For situation comedies, detection of physical settings using mosaic representation of a scene, and detection of leading cast characters using audio-visual cues have been shown to be useful, Aner et al., "Video summaries through mosaic-based shot and scene clustering," *Proc. European Conference on Computer Vision*, 2002, and Li, "Content-based video analysis, indexing and representation using multimodal information," *Ph.D Thesis, University of Southern California*, 2003.

For sports video summarization, some methods detect domain-specific events that are correlated with highlights using audio-visual cues, Pan et al., "Detection of slow-motion replay segments in sports video for highlights generation," *Proc. IEEE International Conf. on Acoustics, Speech and Signal Processing*, 2001, and Xu et al., "Creating audio keywords for event detection in soccer video," *Proc. of ICME*, 2003. Another method extracts play-break segments in an unsupervised manner, Xie et al., "Unsupervised mining of statistical temporal structures in video," *Video Mining*, Rosenfeld et al. Eds, Kluwer Academic Publishers, 2003.

For movie content, detection of syntactic structures, such as scenes with only two speakers, and the detection of 'unusual' events, such as explosions have been shown to useful, Sundaram et al., "Determining computable scenes in films and their structures using audio-visual memory models," *ACM Multimedia*, 2000.

For surveillance content, detection of 'unusual' events using object segmentation and tracking from video has been shown to be effective, Wu et al., "Multi-camera spatio-temporal fusion and biased sequence data learning for security surveillance," *ACM Multimedia*, 2003.

The following U.S. patents and patent applications also describe methods for extracting features and detecting events in multimedia, and summarizing multimedia, U.S. patent application Ser. No. 09/518,937, "Method for Ordering Data Structures in Multimedia," filed Mar. 6, 2000 by Divakaran, et al., U.S. patent application Ser. No. 09/610,763, "Extraction of Semantic and Higher Level Features from Low-Level Features of Multimedia Content," filed on Jul. 6, 2000, by Divakaran, et al., U.S. Pat. No. 6,697,523, "Video Summarization Using Motion and Color Descriptors," issued to Divakaran on Feb. 24, 2004, U.S. patent application Ser. No. 09/845,009, "Method for Summarizing a Video Using Motion Descriptors," filed on Apr. 27, 2001 by Divakaran, et al., U.S. patent application Ser. No. 10/610,467, "Method for Detecting Short Term Unusual Events in Videos," filed by Divakaran, et al. on Jun. 30, 2003, and U.S. patent application Ser. No. 10/729,164, "Audio-visual Highlights Detection Using Hidden Markov Models," filed by Divakaran, et al. on Dec. 5, 2003. All of the above are incorporated herein by reference.

Even though it is known how to detect patterns for some specific genres of multimedia, a generalized detection task remains a problem due to intra-genre variations as a result of differing multimedia production styles used by different content providers, and other factors. For instance, patterns in surveillance videos can never be anticipated. Otherwise surveillance videos would not be necessary. Thus, it is impossible to construct supervised models for event detection in such videos.

Clearly, there is a need for a method that can detect patterns of events in any multimedia, independent of the genre.

Following are some of the desired requirements for a multimedia summarization and event pattern recognition.

First and foremost, the method should be content-adaptive and unsupervised. Second, the method should have a common feature extraction and statistical analysis framework to discover patterns of events. Then, the same feature extraction process can be used as a front-end for all genres of multimedia, and the same post-processing stage can act upon discovered patterns to identify 'unusual' events, even if the meaning of what is unusual changes depending on the genre of the multimedia. The method should also incorporate a ranking scheme for detected events so that an appropriate summary can be determined.

SUMMARY OF THE INVENTION

The present invention detects temporal patterns of events in multimedia content independent of the genre. The invention uses a unified, content-adaptive, unsupervised learning framework to bring out such temporal patterns from different genres of multimedia.

The method formulates the problem of pattern detection as a time series clustering problem. Sequences of low and medium level audio-visual features are extracted from the multimedia. The features are treated as time series. The time series are segmented temporally based on an eigenvector analysis of an affinity matrix constructed from statistical models estimated from the time series.

A temporal segmentation can be used to detect transition points and 'outliers' from the sequences of extracted features. For each detected outliers, a confidence measure is defined in terms of a probability. A relationship is established between learning parameters and the confidence measure using bootstrapping and kernel density estimation. Thereby, the invention enables a systematic method to select the learning parameters for any multimedia genre. Furthermore, the confidence measure can be used to rank the detected transitions in terms of their departures from the background process.

DETAILED DESCRIPTION OF THE PREFERRED EMBODIMENT

Figure 1:
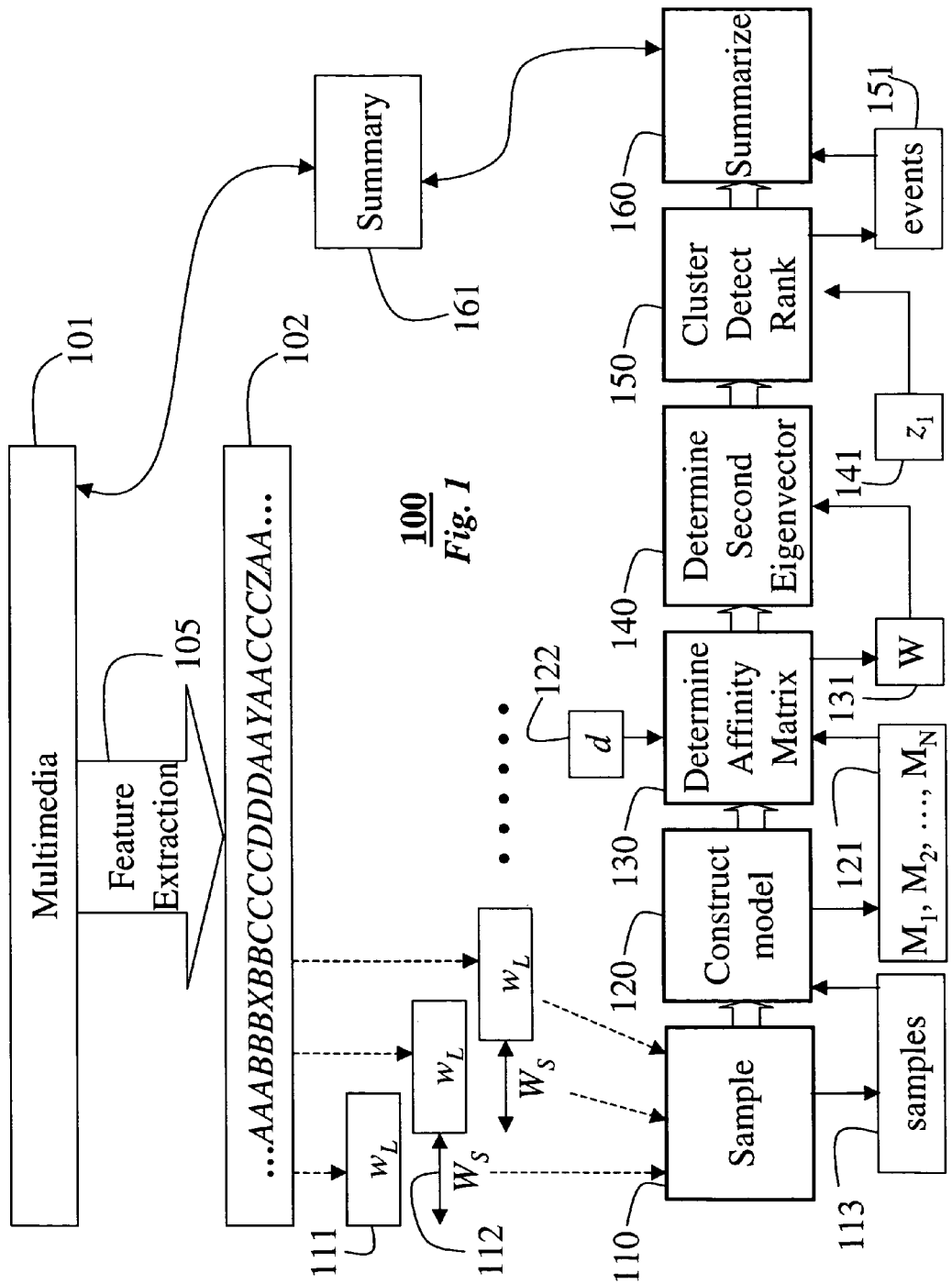
FIG. 1 is a flow diagram of a method for detecting events in multimedia content according to the invention.

Our invention is based on the observation that foreground 'unusual' events in multimedia happen sparsely among a background of 'usual' events. Some examples of unusual events include the following. In a sports program, most of the audio portion of the program is dominated by play commentary. However, occasionally, a burst of overwhelming audience reaction, e.g., cheering, clapping, and waving, follows the relatively rare scoring events. In a situation comedy program, a burst of laughter typically follows a comical event, among a background of dialogues. In a surveillance video, a burst of motion or loud noise follows a suspicious event in a mostly silent or static background.

This motivates us to formulate the problem of detecting unusual events in multimedia as that of detecting 'outliers'. We model statistically a mostly stationary background process in terms of low and medium level audio-visual features extracted from the video, even though the background process is stationary only for small periods of time, and can change over time. This implies that background modeling is performed adaptively throughout the content. This also implies that the modeling can be sufficient to deal with one background process at a time to detect outliers.

Problem Formulation

A dominant or 'usual' class of events in multimedia can be represented by $C_1$. These usual events can be thought of as a background process in the multimedia. An 'unusual' class of events in the multimedia can be represented by $C_2$. These unusual events can be thought of as a foreground process.

If a time sequence of observations or low and medium level audio-visual features extracted for the two the classes of events ($C_1$ and $C_2$) in the multimedia corresponds to

. . . $C_1C_1C_1C_1C_1C_2C_1C_1C_1C_1C_1C_1C_1C_2C_1C_1C_1C_1C_1$ $C_1$ . . . , then the problem of detecting unusual events is that of finding the occasional unusual, foreground events $C_2$, among all of the usual, background events $C_1$, and the corresponding times of occurrences of their realizations.

To begin with, the statistics of the usual events of class $C_1$ are assumed to be stationary, at least with respect to the times periods of infrequent unusual events. However, there is no such assumption about the unusual events of class $C_2$. The class $C_2$ events can even be a collection of a diverse set of random processes. The only requirement is that the number of occurrences of unusual events $C_2$ is relatively small compared to the much larger number of occurrences of the dominant class of usual events $C_1$.

Note that this formulation is a special case of a more general problem, namely clustering of a time series in which a single highly dominant process does not necessarily exist.

We treat the sequence of low and medium level audio-visual features extracted from the video as a time series and perform a temporal segmentation to detect transition points and outliers from a sequence of observations, i.e., extracted features.

Segmentation Using Eigenvector Analysis of an Affinity Matrix

Segmentation using eigenvector analysis has been described for images, Shi et al., "Normalized cuts and image segmentation," *Proc. of IEEE Conference on Computer Vision and Pattern Recognition*, 1997. That segmentation is related to graph theoretic formulation of grouping.

A set of points in an arbitrary feature space V is represented as a weighted undirected graph, where each node of the graph is a point in a feature space, and an edge is formed between every pair of nodes. A weight on an edge expresses a similarity of the pair of nodes. The similarity between nodes i and j can be represented by the weight w(i,j) on the edge.

In order to understand a partitioning criterion for the graph, consider partitioning the graph into two clusters A and B, such that $A \cup B = V$, where V is the entire feature space, then $$N_{cut}(A, B) = \frac{\sum_{i \in A, j \in B} w(i, j)}{\sum_{i \in A, j \in V} w(i, j)V} + \frac{\sum_{i \in A, j \in B} w(i, j)}{\sum_{i \in B, j \in V} w(i, j)V}. \quad (1)$$

Shi et al. describe how minimizing $N_{cut}$, minimizes the similarity between clusters, while maximizing the association within individual clusters. Shi et al. also describe that $$\min_x N_{cut}(x) = \min_y \frac{y^T(D-W)y}{y^TD^T}, \quad (2)$$

with a condition $y_i \in \{-1, b\}$. Here, W is a symmetric affinity matrix of size N×N, which includes similarities between nodes i and j, w(i,j) as entries, D is a diagonal matrix with $$d(i, i) = \sum_j w(i, j),$$

and $y^T$ represents transpose of vector y. The parameters x and y are cluster indicator vectors, i.e., if y(i) equals −1, then a feature point 'i' belongs to cluster A, else the feature point belongs to cluster B. It is also known that the solution to the above equation is same as a solution to the following generalized eigenvalue system if y is relaxed to take on real values, $$(D-W)y = \lambda Dy, \quad (3)$$

where $\lambda$ is the corresponding eigenvalue of eigenvector y.

This generalized eigenvalue system is solved by first transforming the system into a standard eigenvalue system by substituting $z = D^{1/2}y$ to obtain $$D_i^{-1/2}(D-W)D^{-1/2}z = \lambda z. \quad (4)$$

It can be verified that $z_0 = D^{1/2}\vec{1}$ is a trivial solution with an eigenvalue equal to 0. The second generalized eigenvector $z_1$, which is the smallest non-trivial solution of this eigenvalue system, provides the segmentation that optimizes $N_{cut}$ for two clusters.

Kernel Density Estimation

Given n random samples $x_1, x_2, \ldots, x_n$ of observations of d-dimensional vectors from some unknown density function ($f$) and a kernel (K), an estimate for a true density can be obtained as:

$$\hat{f}(x) = \frac{1}{nh^d}\sum_{i}^{n} K\left(\frac{x-x_i}{h}\right), \quad (5)$$

where h is a bandwidth parameter that determines the scale of the chosen kernel function. If we use a mean squared error (MSE) as a measure of efficiency of the density estimate, the tradeoff between bias and variance of the estimate is $$MSE = E[\hat{f}(x) - f(x)]^2 = Var(\hat{f}(x)) + Bias(\hat{f}(x))]^2 \qquad (6)$$

The bias is proportional to $h^2$ and the variance is proportional to $n^{-1}h^{-d}$, Wand et al., Kernel Smoothing, *London, Chapman & Hall*, 1995. Thus, for a fixed bandwidth estimator, one selects a value of the bandwidth parameter h that achieves an optimal tradeoff. We use a data driven bandwidth selection process for the estimation, generally described by Sheather et al., "A reliable data-based bandwidth selection method for kernel density estimation," *J.R. Statist. Society*, 1991.

Pattern Discovery

As shown in FIG. 1, the invention provides a method 100 for detecting times of occurrences of foreground, unusual events $C_2$ among background, usual events $C_1$, from a time series of observations.

In a preliminary step, low and medium level features (... A ... Z ...) 102 are extracted 105 from multimedia 101. The extracted features 102 are labeled using a set S of discrete labels, i.e., an alphabet of $C_1$ and $C_2$ is the set S={A, B, C, D, E, ..., X, Y, Z}. Alternatively, the labels can be continuous. The features 102 are treated as a time series that define the underlying multimedia content 101 for the purpose of our event detection. It should be noted that multiple synchronized time series can be used, for example, one low level series indicates nothing but audio volume, while another series distinguishes speech, music, silence, and non-speech. Speech can further be classified as female or male speech. These time series, can be used in conjunction with other time series for the video portion.

For an audio portion of the multimedia, audio features can include low level features such as pitch, amplitude, Mel frequency cepstral coefficients (MFCC), and medium level features such as speech and music. For a video portion, low level video features can include color, motion, texture, etc. Medium level features can include MPEG-7 descriptors, if the video is compressed. As an advantage, these features are present in any genre of multimedia.

The time series of features 102 are sampled 110 as multiple (N) 'samples' 113. The sampling uses a sliding window 111 of length $W_L$, and a step size $W_S$ 112. These parameters can be specified in terms of labels, frames, or time. In the preferred embodiment of the invention, the sampling is uniform. For each step, the sample in the window defines a 'context' of the multimedia.

A context model 121 is constructed 120 for each of the N samples 113 or 'context'. The modeling can use discrete or continuous statistical functions.

An N×N symmetric affinity matrix W 131 is determined 130 for the entire time series using the context models 121, and a commutative distance metric d 122 defined between pairs of context models.

A second generalized eigenvector $z_1$ 141 is determined 140 for the affinity matrix. The second generalized eigenvector is then used to cluster 150 events 151, detect unusual events or 'outliers', and rank the events.

The ranked events 151 can be used to summarize 160 the content of multimedia 101 as an abstract or summary 161.

In the method 100 according to our invention, there are three key issues, namely the statistical models 121 for the context, and the choice of the two parameters, $W_L$ and $W_S$.

A simple unconditional probability distribution function PDF suffices as the context model in the case of a memoryless background process. However, if the background process has some memory, the selected model would have to account for the background process. For instance, a hidden Markov model can provide a first order approximation of the background process.

The choice of the two parameters ($W_L$ and $W_S$) can be determined by a confidence that a particular event is 'unusual'. A length of the sampling window $W_L$ determines a reliability of the statistical model for the context within the window. The size of the step $W_S$, determines a resolution at which the unusual events are detected.

Confidence Measure on Detected Unusual Events

In our method 100, we first estimate parameters of the background process from the samples within the window of length $W_L$. Then, we measure how different a particular model is from other context models. The difference is caused, either by the observations from $C_2$ within the window $W_L$, or by a variance of the estimate of the background model. If the observed difference between two context models is 'substantially higher than allowed' by the variance of the estimate itself, then we are 'substantially confident' that the variance is due to the 'corruption' of one of the contexts with observations from unusual events $C_2$.

In the following, we quantify what is 'substantially higher than allowed', and what is 'substantially confident' in terms the window length $W_L$.

Confidence Measure for Binomial and Multinomial PDF Models

For the background process to be modeled by a binomial or multinomial PDF, the features 102 have discrete labels S={A, B, C, D, E, ...}. Given a context for a window of length $W_L$ of samples, we can estimate a probability of each of the labels in S using a relative frequency definition of probability.

An unbiased estimator for a probability of the label A is represented by $\hat{p}_A$. The value $\hat{p}_A$ is a binomial random variable that can be approximated by a Gaussian random variable with mean $p_A$ and a variance $$\sqrt{\frac{p_A(1-p_A)}{W_L}}$$

when $W_L \geq 30$ labels.

As described above, we are interested in knowing the confidence interval of the random variable d, which measures the difference between two estimates of context models. For mathematical tractability, let us consider the Euclidean distance metric between two PDF's, even though it is only a monotonic approximation to a rigorous measure such as the Kullback-Leibler distance $$d = \sum_{i \in S} (\hat{p}_{i,1}) - (\hat{p}_{i,2})^2. \qquad (7)$$

Here, $\hat{p}_{i,1}$ and $\hat{p}_{i,2}$ represent estimates for the probability of $i^{th}$ label from two different contexts of length $W_L$. Because $\hat{p}_{i,1}$ and $\hat{p}_{i,2}$ are both Gaussian random variables, d is a $\chi^2$ random variable with n degrees of the freedom, where n is a cardinality of the set S.

Now, we assert, with substantial probability, $$N\% = \int_L^U f_{\chi_n^2}(x)dx \qquad (8)$$

that any estimate of (d̂) lies in a closed interval [L, U]. In other words, we can be N % confident that the difference between two context model estimates outside this interval is caused by an occurrence of an unusual event $C_2$ in one of the contexts. Also, we can rank all the outliers using the probability density function of d.

Verification

To verify the above analysis, the following simulation can be performed. We generated two contexts of length $W_L$ from a known binomial or multinomial PDF, assumed to be a background process as defined above. The models estimated from these two contexts are represented by $M_1$ and $M_2$, respectively. Then, we use 'bootstrapping' and kernel density estimation to verify the analysis on PDF of d as described below:

1. Generate $W_L$ labels from $M_1$ and $M_2$;
2. Re-estimate the model parameters $\hat{p}_{i,1}$ and $\hat{p}_{i,2}$ based on the generated data and determine the commutative distance metric (d) for comparing two context models;
3. Repeat steps 1 and 2, N times; and
4. Obtain the PDF of d, $\hat{p}_{i,1}$ and $\hat{p}_{i,2}$ from the kernel density estimation.

Confidence Measure for GMM & HMM Models

If the observations of the memoryless background process are continuous labels, instead of discrete labels, then one can use continuous labels and model the PDF of the process using a Gaussian mixture model (GMM). If the process has first order memory, then one can model its first-order PDF using a hidden Markov model (HMM).

Let $\lambda = (A, B, \pi)$ represent the model parameters for both the HMM and GMM, where A is a state transition matrix, B is a sample label probability distribution, and $\pi$ is an initial state distribution. For the GMM, A and $\pi$ are equal to 1, and B represents the mixture model for the distribution. For the HMM with continuous samples, B is a mixture model in each of the states. For the HMM with discrete labels as observations, B is a multinomial PDF in each of the states.

Even when two context models have different parameters, the models can be statistically equivalent. Hence, the following commutative distance metric is used to compare two context models $\lambda_1$ and $\lambda_2$ constructed from observation sequences or samples $O_1$ and $O_2$, respectively, $$d(\lambda_1, \lambda_2) = 1/W_L(\log P(O_1|\lambda_1) + \log P(O_2|\lambda_2) - \log P(O_1|\lambda_2) - \log P(O_2|\lambda_2)). \qquad (9)$$

The first two terms in the distance metric measure the likelihood of training data given the estimated models. The last two cross terms measure the likelihood of observing O under $\lambda_1$, and vice versa. If the two models are different, then the cross terms are substantially smaller than the first two terms. The defined distance metric d does not lend itself to a similar analysis, as in the case of binomial and multinomial models, that can help us find its PDF. Hence, we apply bootstrapping to obtain several observations of the distance metric and use kernel density estimation to obtain the PDF of the defined distance metric.

Note that the support of the PDF decreases as $W_L$ increases from 100 frames to 600 frames. The reliability of the two context models for the same background process increases as the amount of training data increases, and hence, the variance of normalized log likelihood difference decreases. Therefore, it is possible to quantify any log likelihood difference value caused by corruption of observations from another process, e.g., the foreground process ($C_2$). Similar analysis shows the same observations hold for HMMs as context models as well.

Using Confidence Measures to Rank Outliers

Above, we describe the estimation of the PDF of a specific distance metric for context models, e.g., memory-less models and HMMs, used by our method. Then, for a given time series of observations from $C_1$ and $C_2$, we determine the affinity matrix for a selected window length of $W_L$ for the context model.

We use the second generalized eigenvector $z_1$ to detect inliers and outliers. Then, the confidence metric for an outlier context model, $M_j$ is determined as:

$$p(M_j \in O) = 1/\#I\left(\sum_{i \in I} P_{d,i}(d \le d(M_i, M_j))\right), \qquad (10)$$

where $P_{d,i}$ is the density estimate for the distance metric using the observations in the inlier context i. The values O and I represent the set of outliers and inliers respectively. The symbol #I represents the cardinality of the set of inliers.

If the density estimate obtained, either through bootstrapping and kernel density estimation or through a similar analysis as for binomial and multinomial cases, has finite support, then some of the outliers, which are very distinct from the inliers and cannot be ranked as $P_{d,i}(d \le d(M_i, M_j))$d, are equal to one. In such cases, the distance itself can be used to rank the outliers.

The order of ranking is not affected by the use of $d(M_i, M_j)$, instead of $P_d(d \le d(M_i, M_j))$ because the cumulative distribution function (CDF) is a monotonically increasing function. However, the use of $d(M_i, M_j)$ can make it more difficult to merge ranked lists as the meaning of $d(M_i, M_j)$ is dependent on the background.

Application to Sports Video

As described above, 'unusual' events in sports video happen occasionally among a background of the usual process. In a golf game, the usual process is the commentator's speech in a quiet background. In a soccer game, the usual process is the commentator's speech in a relatively noisy background. But, in order to extract unusual program segments, e.g., commercials, from the whole video, we use our method at a coarser scale as described below, based on the observation that commercials are 'unusual' in the background of the whole program.

Event Detection Using Second-Level Labels

Because our method assumes that the background process is relatively stationary, our first step is to cluster the time series from the whole sports video to identify contiguous sections of the time series that have the same background.

Figure 2:
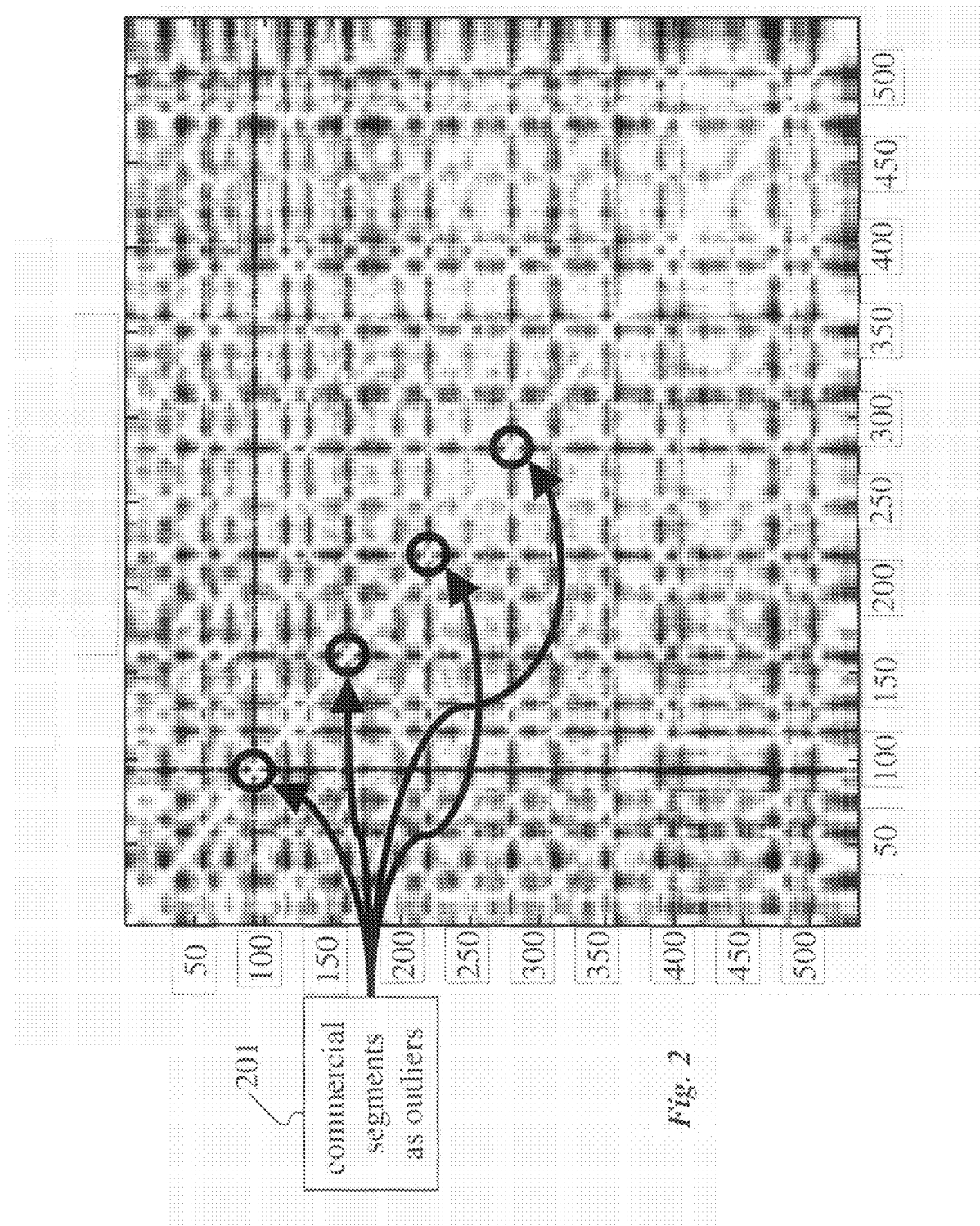
FIG. 2 is an image of an affinity matrix according to the invention.

FIG. 2 shows an affinity matrix for a three hour long video of golf. We use a two-state HMM to model each time series of one-hundred and twenty ($W_L$) classification labels with a step size ($W_S$) of ten. The affinity matrix is constructed using the pairwise likelihood distance metric defined above. Note that the affinity matrix shows dark regions against a single background. The dark regions, i.e., outliers, are verified to be times of occurrences of commercials 201.

Because we use the time series of the labels at a one second resolution, the detected outliers yield a coarse segmentation of the whole video into two clusters: the segments that represent the program, and the segments that represent the commercials. Also, such a coarse segmentation is possible because we used a time series of medium level classification labels, e.g., speech and non-speech, instead of low-level features. The use of low-level audio features at this stage brings out some fine scale changes that are not relevant for distinguishing program segments from non-program segments. For instance, low-level features can distinguish two different speakers in the content, while a more general speech label groups them as one.

Detecting Unusual Events

Unusual events, together with an audience reaction, in a sports video last typically for only few seconds. This implies that we cannot use second-level classification labels to extract short unusual events. If we use second-level classification labels, the size of $W_L$ has to be small enough to detect events at that resolution. However, our analysis on the confidence measures above, indicates that a small value of $W_L$, lead to a less reliable context model.

Therefore, we have at least the following two options: process the time series using frame-level classification labels, instead of medium-level labels, or process the time series using low-level MFCC features. Clearly, using the frame-level classification labels is computationally more efficient. Also, as described above, working with labels can suppress irrelevant changes in the background process, such as different speakers.

Application to Surveillance Video

In the case of a sports video, we can use some a priori knowledge about the application domain to train sound classes such as applause, cheering, etc., to extract additional time series apart from the time series of low-level features.

In a surveillance video, the type of sounds that can characterize unusual events cannot always be anticipated. However, our method provides a systematic methodology to acquire domain knowledge to identify 'distinguishable' classes of sounds. Without any a priori knowledge, we use low-level features in such scenarios to effectively characterize the domain and detect events.

EFFECT OF THE INVENTION

The invention provides a unified, content-adaptive, unsupervised data method for detecting unusual events in multimedia. The method is based on a statistical modeling of a time series of low level features or medium level semantic labels followed by segmentation using graph theoretic formulation of grouping. The method also provides a confidence measure for detected events.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for detecting events in multimedia, comprising:
   extracting features from the multimedia;
   sampling the features using a sliding window to obtain a plurality of samples;
   constructing a context model for each sample;
   determining an affinity matrix from the models and a commutative distance metric between each pair of context models;
   determining a second generalized eigenvector for the affinity matrix;
   clustering the plurality of samples into events according to the second generalized eigenvector; and
   generating a summary of the multimedia according to the events.

2. The method of claim 1, in which the events include usual events of a background process and unusual events of a foreground process.

3. The method of claim 1, in which the multimedia includes an audio portion and audio features are selected from the group consisting pitch, amplitude, Mel frequency cepstral coefficients, speech and music.

4. The method of claim 1, in which the multimedia includes a video portion and video features are selected multimedia from the group consisting of color, motion, texture, and MPEG-7 descriptors.

5. The method of claim 1, in which the sliding window has a length $W_L$, and a step size $W_S$, and wherein the length determines a reliability of the context model, and the step size determines a resolution of the events.

6. The method of claim 1, in which the second generalized eigenvector ranks the events.

7. The method of claim 6, further comprising:
   summarizing the multimedia according to the ranked events.

8. The method of claim 2, in which the background process is memoryless, and the context model is an unconditional probability distribution function.

9. The method of claim 2, in which the background process has memory, and the context model is a hidden Markov model.

10. The method of claim 1, in which the context model is a Gaussian mixture model.

11. The method of claim 1, in which the sliding window has a length $W_L$, and the commutative distance metric d for each pair of context models $\lambda_1$ and $\lambda_2$ constructed from samples $O_1$ and $O_2$, respectively is $D(\lambda_1, \lambda_2) = 1/W_L(\log P(O_1|\lambda_1) + \log P(O_2|\lambda_2) - \log P(O_1|\lambda_2) - \log P(O_2|\lambda_1))$.

* * * * *